US009260023B2

United States Patent
Ono

(10) Patent No.: US 9,260,023 B2
(45) Date of Patent: Feb. 16, 2016

(54) CABLE WINDING DEVICE

(75) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 14/344,170

(22) PCT Filed: Sep. 26, 2011

(86) PCT No.: PCT/JP2011/071845
§ 371 (c)(1),
(2), (4) Date: Mar. 11, 2014

(87) PCT Pub. No.: WO2013/046290
PCT Pub. Date: Apr. 4, 2013

(65) Prior Publication Data
US 2014/0339039 A1    Nov. 20, 2014

(51) Int. Cl.
| | |
|---|---|
| B60L 11/00 | (2006.01) |
| B60L 11/18 | (2006.01) |
| H02G 11/02 | (2006.01) |
| B65H 75/40 | (2006.01) |
| B65H 75/44 | (2006.01) |
| B60L 11/12 | (2006.01) |
| B60L 11/14 | (2006.01) |

(52) U.S. Cl.
CPC .......... *B60L 11/1816* (2013.01); *B60L 11/123* (2013.01); *B60L 11/126* (2013.01); *B60L 11/14* (2013.01); *B60L 11/1818* (2013.01); *B60L 11/1877* (2013.01); *B65H 75/40* (2013.01); *B65H 75/446* (2013.01); *H02G 11/02* (2013.01); *B60L 2210/10* (2013.01); *B60L 2210/30* (2013.01); *B60L 2210/40* (2013.01); *B60L 2230/12* (2013.01); *B60L 2240/36* (2013.01); *B65H 2701/34* (2013.01); *Y02T 10/7005* (2013.01); *Y02T 10/7088* (2013.01); *Y02T 90/121* (2013.01); *Y02T 90/14* (2013.01)

(58) Field of Classification Search
CPC . B60L 11/1816; B60L 2230/12; B65H 75/40; B65H 75/446; B65H 2701/34; H02G 11/02; Y02T 10/7005; Y02T 10/7088; Y02T 90/121; Y02T 90/14

See application file for complete search history.

(56) References Cited

U.S. PATENT DOCUMENTS

| | | | | |
|---|---|---|---|---|
| 4,725,697 | A * | 2/1988 | Kovacik et al. | 191/12.4 |
| 6,170,775 | B1 * | 1/2001 | Kovacik et al. | 242/404 |
| 6,273,354 | B1 * | 8/2001 | Kovacik et al. | 242/404 |
| 7,114,603 | B2 * | 10/2006 | Lai | 191/12.4 |

(Continued)

FOREIGN PATENT DOCUMENTS

| | | |
|---|---|---|
| JP | U1-52-128968 | 9/1977 |
| JP | U-61-162217 | 10/1986 |

(Continued)

*Primary Examiner* — Jason C Smith
(74) *Attorney, Agent, or Firm* — Oliff PLC

(57) ABSTRACT

A cable winding device is provided, around which a cable unit is wound that includes a first connector, a first cable connected to the first connector, and a control unit connected to the first cable and controlling an amount of a current flowing through the first cable. The cable winding device includes a fixing portion, a rotating portion provided rotatably with respect to the fixing portion. The rotating portion includes a tube portion having an outer circumferential surface around which the first cable is wound, and a first holding portion provided within the tube portion and holding the control unit.

9 Claims, 11 Drawing Sheets

(56) References Cited

U.S. PATENT DOCUMENTS

| | | | |
|---|---|---|---|
| 7,438,258 B2* | 10/2008 | Chen | 242/614 |
| 7,984,798 B1* | 7/2011 | Hall | 191/12 R |
| 2011/0149455 A1* | 6/2011 | Ueno et al. | 361/87 |
| 2014/0339039 A1* | 11/2014 | Ono | 191/12.4 |

FOREIGN PATENT DOCUMENTS

| | | |
|---|---|---|
| JP | A-2010-52861 | 3/2010 |
| JP | A-2010-161886 | 7/2010 |
| JP | A-2010-226817 | 10/2010 |
| WO | WO 2010/023527 A2 | 3/2010 |

* cited by examiner

CABLE WINDING DEVICE

TECHNICAL FIELD

The present invention relates to a cable winding device.

BACKGROUND ART

In consideration of the environment, much interest has been recently focused on a hybrid vehicle, an electric vehicle, a fuel-cell vehicle and the like equipped with a battery.

Accordingly, attention has also been given to a charging device for charging the battery equipped in the vehicle from outside the vehicle.

For example, a cord set for charging an electric vehicle disclosed in Japanese Patent Laying-Open No. 2010-52861 includes an interrupt device having two terminal units; a housing that houses this interrupt device; a plug connected to an outlet installed in a wall surface of a building; and a connector connected to an inlet of the electric vehicle.

This cord set includes a first cord having one end connected to one terminal unit and the other end connected to the plug; and a second cord having one end connected to the other terminal unit and the other end connected to the connector.

Furthermore, the cord set includes a drum rotatably provided in the housing that houses the interrupt device and having an outer circumferential surface around which the second cord is wound. The first cord is pulled out through a hole provided in the housing to the outside of the housing. The end of the pulled out first cord is provided with a plug.

The charging device disclosed in Japanese Patent Laying-Open No. 2010-226817 is a wall-hung type charging device. This charging device includes a cabinet for charging; a flat plate portion formed below the cabinet; a CCID holder formed in the flat plate portion; a CCID mounted on this CCID holder; and a charging cable connected to the CCID and hooked on to the cabinet.

Japanese Patent Laying-Open No. 2010-161886 and the like also disclose various types of charging devices.

CITATION LIST

Patent Document

PTD 1: Japanese Patent Laying-Open No. 2010-52861
PTD 2: Japanese Patent Laying-Open No. 2010-226817
PTD 3: Japanese Patent Laying-Open No. 2010-161886

SUMMARY OF INVENTION

Technical Problem

According to the cord set disclosed in Japanese Patent Laying-Open No. 2010-52861, when the second cord is pulled out, the end of the second cord is rotated with respect to the interrupt device. Accordingly, a rotating terminal is to be employed for the terminal unit connecting the interrupt device and the second cord. This causes a problem that the configuration of this cord set becomes complicated.

In the charging device disclosed in Japanese Patent Laying-Open No. 2010-226817, a cable unit including the CCID, the cable and the like cannot be removed from the cabinet and the flat plate portion. This causes a problem that charging cannot be performed when a vehicle is stopped at some distance away from this charging device.

In addition, the coupling structure of the charging cable disclosed in Japanese Patent Laying-Open No. 2010-161886 does not include a structure of housing the cable.

The present invention has been made in light of the above-described problems. An object of the present invention is to provide a portable cable winding device having a simplified structure.

Solution to Problem

A cable winding device according to the present invention is a cable winding device around which a cable unit is wound that includes a first connector, a first cable connected to the first connector, and a control unit connected to the first cable and controlling an amount of a current flowing through the first cable. This cable winding device includes a fixing portion and a rotating portion provided rotatably with respect to the fixing portion. The rotating portion includes a tube portion having an outer circumferential surface around which the first cable is wound, and a first holding portion provided within the tube portion and holding the control unit.

Preferably, the cable unit includes a second connector connected to a power supply and a second cable connecting the second connector and the control unit. The rotating portion includes a second holding portion provided within the tube portion and holding the second connector. The tube portion includes a first end and a second end arranged in a direction in which a rotation center line of the rotating portion extends. The first end is provided with an opening through which the second connector can be removed.

Preferably, the fixing portion includes a flange portion provided along an outer circumferential edge of the first end and supporting the first cable wound around the tube portion. The flange portion having an inner circumference edge and an outer circumferential edge is provided with a first slit extending from the inner circumference edge to the outer circumferential edge. The tube portion is provided with a second slit extending from an opening edge of the opening toward the second end. The first slit and the second slit are in communication with each other such that a passage is formed, through which the second cable is pulled out from the rotating portion.

Preferably, the tube portion includes a first end and a second end arranged in a direction in which a rotation center line of the rotating portion extends. The fixing portion includes a flange portion provided along an outer circumferential edge of the first end and supporting the first cable wound around the tube portion. A through hole is provided in a portion of the flange portion located closer to an outer circumferential edge of the flange portion than to the outer circumferential edge of the first end.

Preferably, the cable winding device further includes a holding mechanism limiting rotation of the rotating portion with respect to the fixing portion. The tube portion includes a first end and a second end arranged in a direction in which a rotation center line of the rotating portion extends. The fixing portion includes a flange portion provided along an outer circumferential edge of the first end and supporting the first cable wound around the tube portion. The flange portion is provided with a through hole, and the holding mechanism includes a stopper fitting into the through hole.

Preferably, the rotating portion is provided rotatably about a rotation center line. An attachment member includes a protrusion formed at a position in which the rotation center line extends when the fixing portion is mounted on the attachment member. The protrusion protrudes in a direction in which the rotation center line extends. The fixing portion is provided with a first recess into which the protrusion fits. A cross section of the protrusion in a plane perpendicular to the rotation center line is shaped as a circle centered at the rotation center line. The first recess has an inner circumferential surface extending along an outer circumferential surface of the protrusion.

Preferably, the fixing portion is provided with a gripping portion gripped by a user.

The fixing portion includes a leg. The fixing portion is free-standing by installing the leg on an imaginary flat plane.

Advantageous Effects of Invention

The cable winding device according to the present invention can be simplified in structure and can be portable.

DESCRIPTION OF EMBODIMENTS

Referring to FIGS. 1 to 13, a charging device 40 according to the present embodiment will be hereinafter described. Although a description will be made in the present embodiment with regard to the case where charging device 40 is used to charge a battery B mounted in a hybrid vehicle, it goes without saying that this charging device 40 can also be applied to a vehicle equipped with a battery, such as an electric vehicle and a fuel-cell vehicle.

Figure 1:
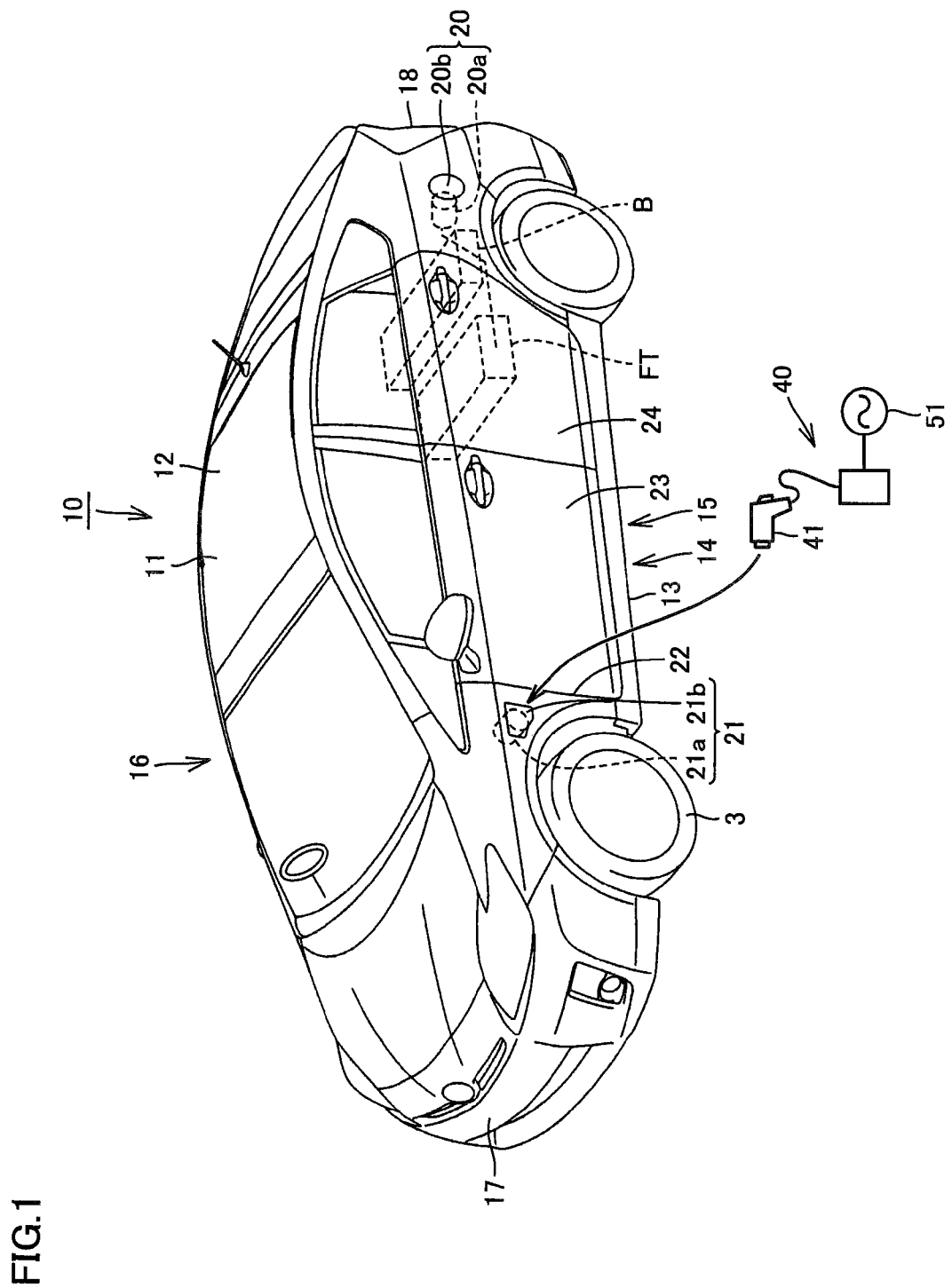
FIG. 1 is a perspective view schematically showing a charging device 40 and a vehicle 10.

FIG. 1 is a perspective view schematically showing a charging device 40 and a vehicle 10. As shown in FIG. 1, vehicle 10 charged by charging device 40 is a hybrid vehicle equipped with a fuel tank FT and battery B.

Vehicle 10 includes a body 11 forming the contour of vehicle 10; and fuel tank FT and battery B that are housed in body 11.

The surface of body 11 includes an upper surface 12, a lower surface 13 and a circumferential surface 14 that includes side surfaces 15 and 16, a front surface 17 and a back surface 18.

Side surface 15 is provided with a passenger entry/exit opening 22. Body 11 includes doors 23 and 24 opening and closing passenger entry/exit opening 22.

Side surface 15 is provided with an oil feeding portion 20 and a charging unit 21. Oil feeding portion 20 is located rearward of passenger entry/exit opening 22, and charging unit 21 is located forward of passenger entry/exit opening 22.

Oil feeding portion 20 includes a nozzle insertion portion 20a into which a nozzle portion of an oil feeding nozzle provided outside is inserted, and a cover portion 20b provided in body 11. When cover portion 20b is opened, an opening of nozzle insertion portion 20a is exposed to the outside, so that the nozzle of the oil feeding nozzle can be inserted into nozzle insertion portion 20a.

The nozzle insertion portion is connected to fuel tank FT, and the fuel supplied through nozzle insertion portion 20a is supplied to fuel tank FT. It is to be noted that a vehicle including an internal combustion engine may be supplied with a fuel, for example, gasoline, LP gas (liquefied petroleum gas), and the like. Furthermore, a vehicle including a fuel cell may be supplied with, for example, liquid hydrogen, ethanol and the like.

Charging unit 21 includes a charging connector 21a equipped with a charging plug 41 provided outside and a cover portion 21b provided in body 11. When cover portion 21b is opened, charging connector 21a is exposed to the outside, so that charging plug 41 can be connected to charging connector 21a.

Charging connector 21a of charging unit 21 receives electric power from charging plug 41. Charging connector 21a is connected to battery B through a converter and the like, and battery B is charged with electric power supplied to charging unit 21.

Figure 2:
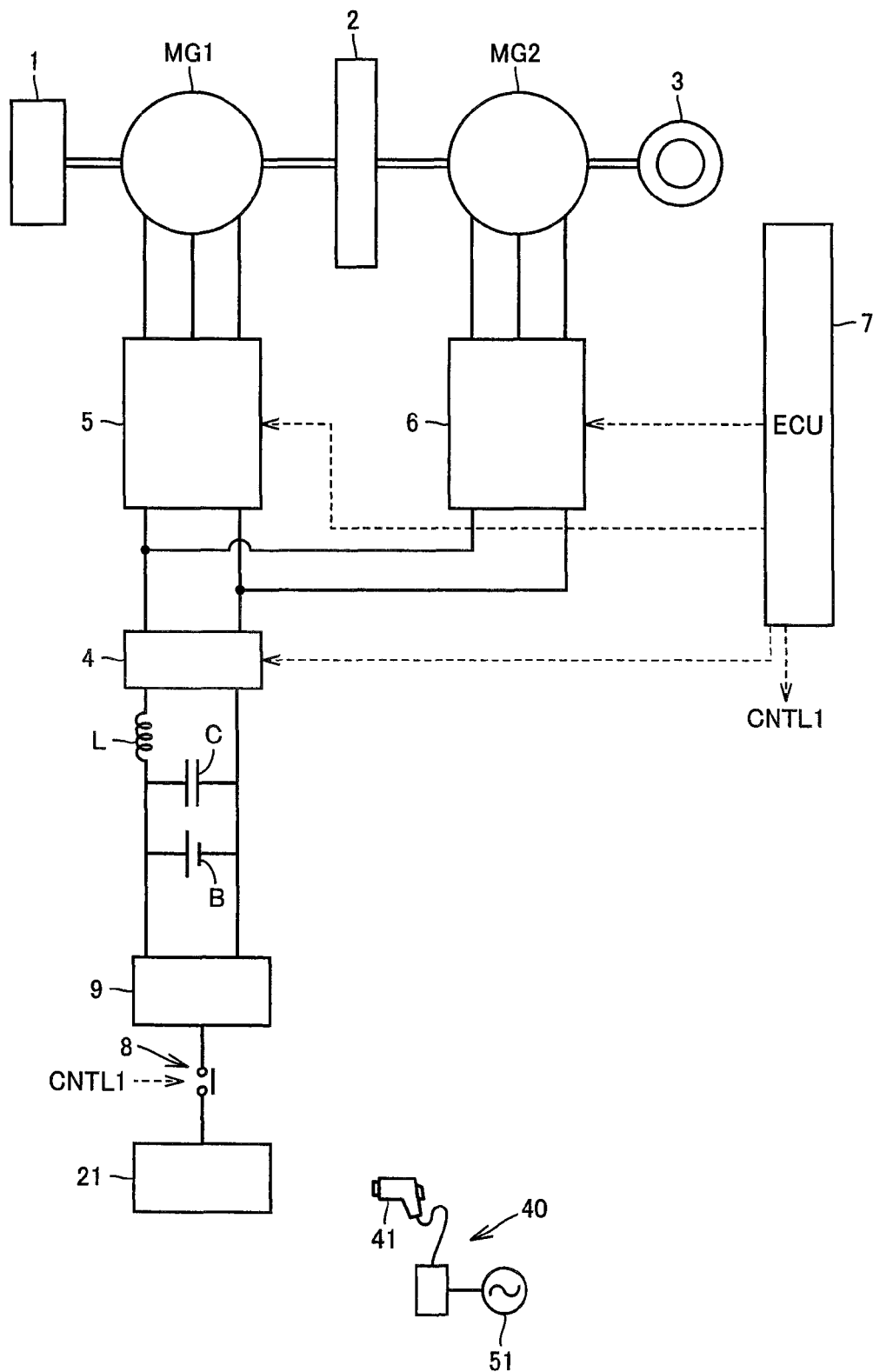
FIG. 2 is a block diagram showing vehicle 10.

FIG. 2 is a block diagram of vehicle 10. Vehicle 10 includes an engine 1, motor generators MG1 and MG2, a power split device 2, battery B, a capacitor C, a reactor L, a converter 4, inverters 5 and 6, a vehicle ECU (Electronic Control Unit) 7, a switching element 8 such as a relay, a converter 9, and a charging unit 21.

Power split device 2 is coupled to engine 1 and motor generators MG1, MG2 for distributing motive power among them. For example, as power split device 2, a planetary gear mechanism having three rotation shafts of a sun gear, a planetary carrier and a ring gear is used. These three rotation shafts are connected to the rotation shafts of engine 1, and motor generators MG1, MG2, respectively. For example, by inserting the crankshaft of engine 1 through the center of a hollow rotor of motor generator MG1, engine 1 and motor generators MG1, MG2 can be mechanically connected to power split device 2.

In addition, the rotation shaft of motor generator MG2 is coupled to a front wheel 3 serving as a driving wheel by a reduction gear and a differential gear that are not shown. A reduction gear for the rotation shaft of motor generator MG2 may further be incorporated in power split device 2.

Motor generator MG1 is incorporated in vehicle 10 as a component that operates as a power generator driven by engine 1 and operates as an electric motor capable of starting engine 1. Motor generator MG2 is incorporated in vehicle 10 as an electric motor driving front wheel 3 serving as a driving wheel of vehicle 10.

Motor generators MG1 and MG2 each are a three-phase alternating-current (AC) synchronous motor, for example. Motor generators MG1 and MG2 each include a three-phase coil formed of a U-phase coil, a V-phase coil and a W-phase coil as a stator coil.

Motor generator MG1 generates a three-phase AC voltage using output from the engine, and outputs the generated three-phase AC voltage to inverter 5. Motor generator MG1 generates driving force by the three-phase AC voltage received from inverter 5, and starts engine 1.

Motor generator MG2 generates driving torque of the vehicle by the three-phase AC voltage received from inverter 6. Motor generator MG2 generates a three-phase AC voltage during regenerative braking of the vehicle, and outputs the generated voltage to inverter 6.

Switching element 8 is provided between converter 9 and charging unit 21, and connects and disconnects between charging device 40 and converter 9. Switching element 8 is switched by a control signal CNTL1 from vehicle ECU7 so as to be turned ON/OFF. Converter 9 is controlled by vehicle ECU7 to be driven.

When battery B is charged using charging plug 41 of charging device 40, vehicle ECU7 turns ON switching element 8 to connect converter 9 and charging device 40. Then, vehicle ECU7 drives converter 9 so as to convert the AC power supplied from the power supply into a DC power.

Figure 3:
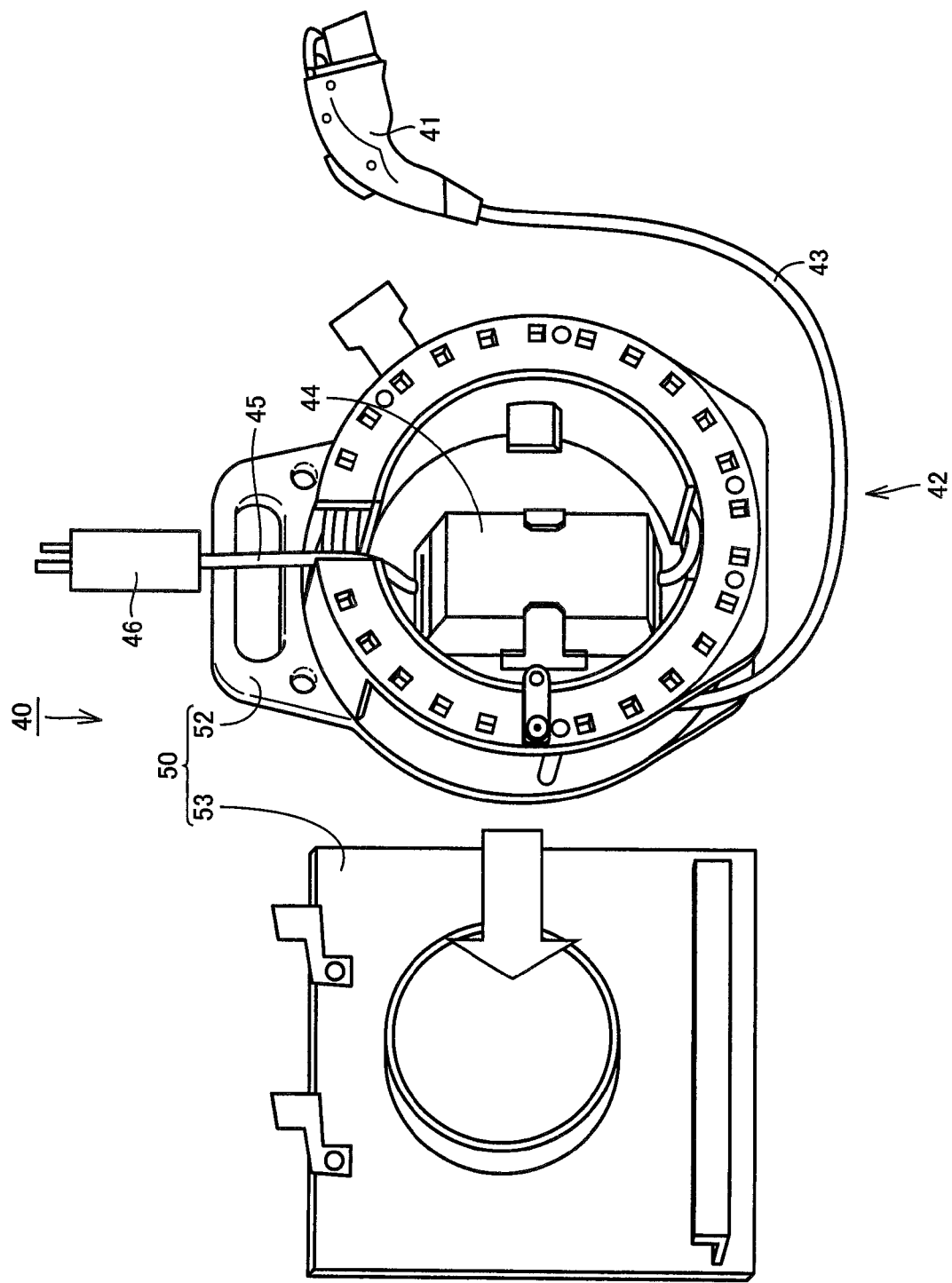
FIG. 3 is a perspective view showing charging device 40.

FIG. 3 is a perspective view of charging device 40. As shown in this FIG. 3, charging device 40 includes a cable unit 42 and a cable winding device 50 around which cable unit 42 is wound.

Cable unit 42 includes a charging plug 41, a cable 43 connected to charging plug 41, a control unit 44 connected to cable 43 and controlling the amount of a current flowing through cable 43, a cable 45 connected to control unit 44, and a plug 46 connected to this cable 45. Plug 46 is connected to a power supply 51 shown in FIG. 1.

Cable winding device 50 includes a device body 52 on which cable unit 42 is mounted in an attachable and detachable manner, and a fixing plate 53 functioning as an attachment member to which device body 52 can be removably attached. Fixing plate 53 is fixed to an object to be fixed such as an outer wall of a house.

Device body 52 can be removable from fixing plate 53 in the state where cable unit 42 is mounted on this device body 52.

Figure 4:
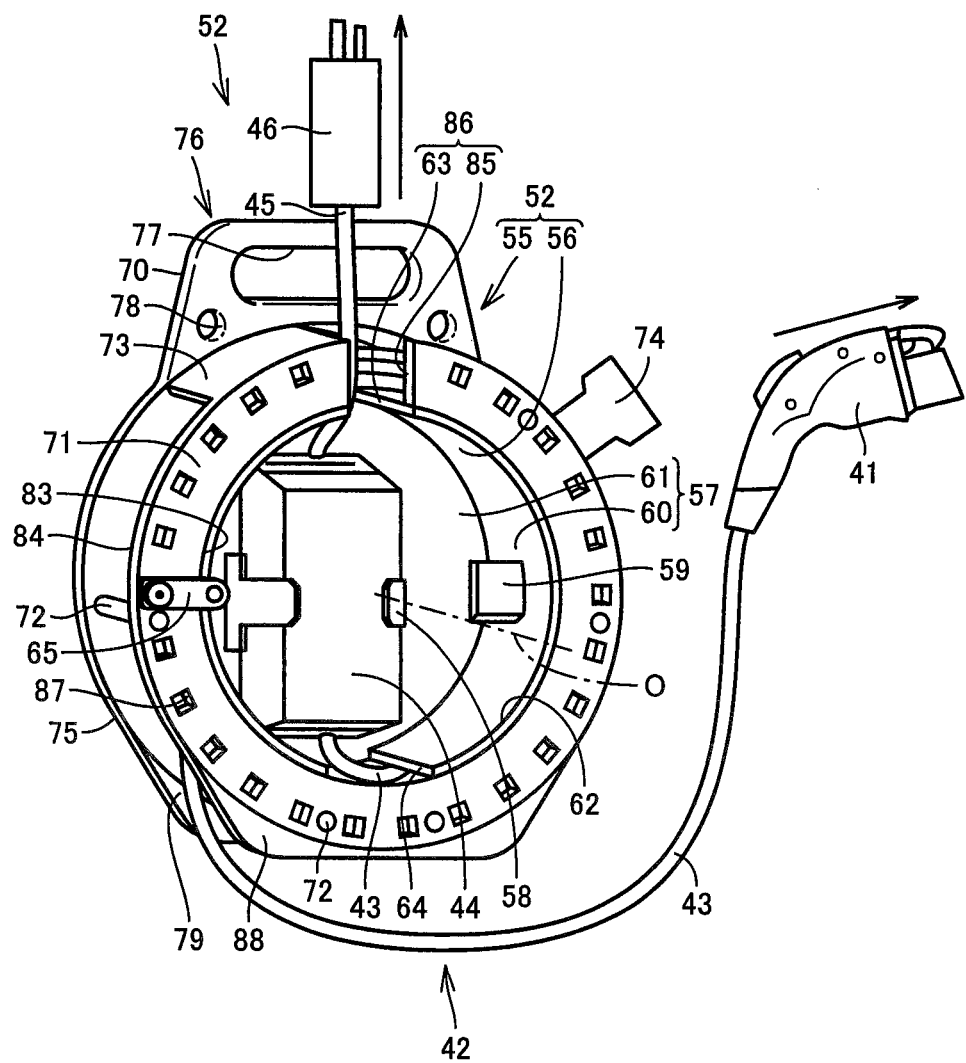
FIG. 4 is a perspective view showing a device body 52 on which a cable unit 42 is mounted.

FIG. 4 is a perspective view showing device body 52 on which cable unit 42 is mounted. As shown in FIG. 4, device body 52 includes a fixing portion 55 and a rotating portion 56 provided rotatably with respect to this fixing portion 55.

Rotating portion 56 includes a tube portion 57 formed in a tubular shape, a holding portion 58 provided within this tube portion 57 and holding control unit 44, a holding portion 59 holding plug 46, and a handle 65 provided in tube portion 57.

Tube portion 57 is formed in the shape of a tube having a bottom, and provided rotatably about a rotation center line O with respect to fixing portion 55.

Tube portion 57 includes a wall surface 61 and a circumferential wall portion 60 formed so as to rise from the circumferential edge of this wall surface 61. Tube portion 57 includes a first end and a second end that are arranged in the direction in which rotation center line O extends. The second end of tube portion 57 has a wall surface 61 and is provided with an opening 62. Circumferential wall portion 60 is provided with slits 63 and 64 that extend from the opening edge of opening 62 toward wall surface 61. Slits 63 and 64 are located so as to face each other across rotation center line O.

Holding portion 58 is provided on wall surface 61 while holding portion 59 is provided on circumferential wall portion 60.

Handle 65 is provided at the opening edge of opening 62, and the user can grip handle 65 to rotate tube portion 57 around rotation center line O.

In this case, control unit 44 is held in holding portion 58, and cable 43 extending from control unit 44 is pulled out through slit 64 onto the outer circumferential surface of circumferential wall portion 60. Then, cable 43 is wound around the outer circumferential surface of circumferential wall portion 60 of cable 43.

Fixing portion 55 includes a back surface wall 70 disposed on the first end side of tube portion 57, a flange portion 71 extending along the opening edge of opening 62, a plurality of coupling members 72 coupling flange portion 71 and back surface wall 70, and a guide plate 73, and a holding portion 74.

Figure 5:
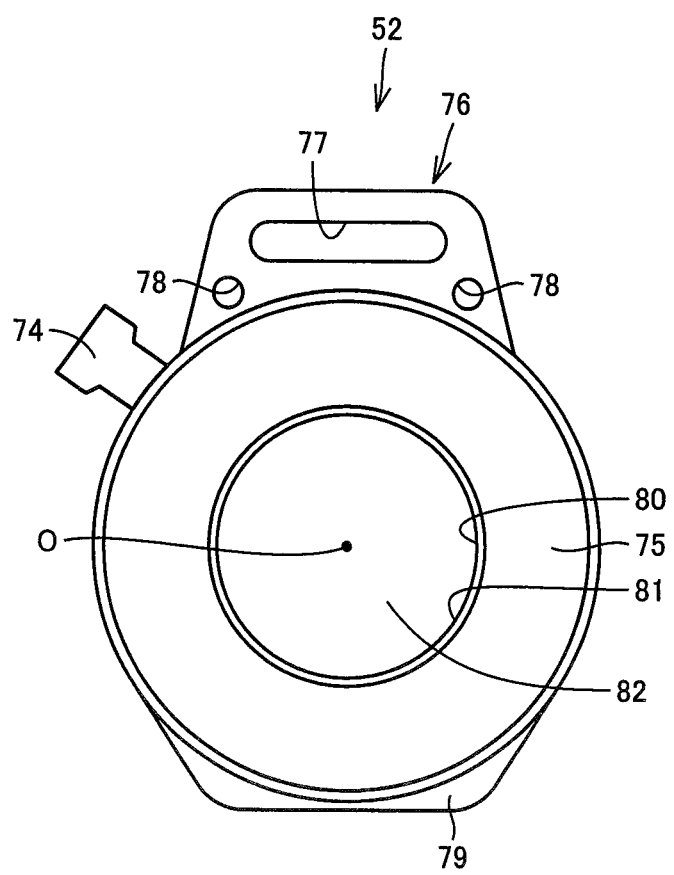
FIG. 5 is a rear view of device body 52.

FIG. 5 is a rear view of device body 52. In FIGS. 4 and 5, back surface wall 70 includes a support plate 75, a gripping portion 76 protruding upward from the upper end of support plate 75, and a leg 79 formed in the lower end of support plate 75.

Support plate 75 is formed so as to project outward as compared with the outer circumferential surface of circumferential wall portion 60 shown in FIG. 4, and supports cable 43 wound around the outer circumferential surface of circumferential wall portion 60. Furthermore, support plate 75 supports tube portion 57 so as to be rotatable.

Support plate 75 is provided with a recess 80, into which a protrusion of fixing plate 53 shown in FIG. 3 fits.

Recess 80 is formed in the position on the surface of support plate 75, along which rotation center line O extends. Recess 80 has an inner surface including a circular bottom wall surface 82, and an inner circumferential surface 81 formed so as to rise from the outer circumference of bottom wall surface 82. Bottom wall surface 82 is formed in the shape of a circle centered at rotation center line O. A cross section of inner circumferential surface 81 in a plane perpendicular to rotation center line O is shaped as a circle centered at rotation center line O.

A "circle centered at rotation center line O" includes a complete circle centered at rotation center line O, and a shape substantially recognized as a circle centered at rotation center line O.

Although inner circumferential surface 81 is formed so as to vertically cross inner circumferential surface 81 in the example shown in FIG. 5, the shape of inner circumferential surface 81 is not limited thereto.

For example, inner circumferential surface 81 may be formed such that its diameter is decreased with increasing proximity to bottom wall surface 82, starting from opening of recess 80.

Gripping portion 76 is formed so as to protrude upward from the upper end of support plate 75. Gripping portion 76 is provided with an insertion hole 77 through which a user's finger can be inserted, and a plurality of holes 78 through which a hook formed in fixing plate 53 shown in FIG. 3 is inserted.

The user can grip gripping portion 76 by causing his/her finger to pass through insertion hole 77. The user can also move device body 52 by gripping the gripping portion 76 even in the state where cable unit 42 is mounted on device body 52.

Leg 79 is formed on the lower end side of support plate 75, and has a prescribed length in the width direction of device body 52.

In FIG. 4, flange portion 71 extends along the opening edge of opening 62, and is formed in an approximately annular shape. In the present embodiment, inner circumference edge 83 of flange portion 71 extends along the opening edge of opening 62. Accordingly, opening 62 is not covered by flange portion 71, but the inside of tube portion 57 is in communication with the outside through opening 62.

Flange portion 71 is formed so as to project outward as compared with the outer circumferential surface of circumferential wall portion 60, and supports cable 43 wound around the outer circumferential surface of circumferential wall portion 60.

Flange portion 71 is provided with a slit 85 formed so as to extend from inner circumference edge 83 of flange portion 71 to outer circumferential edge 84. Slit 85 is greater in width than cable 45.

This slit 85 is formed so as to extend in the vertical direction at the time when device body 52 is free-standing on the imaginary flat plane.

Then, when rotating portion 56 is rotated to bring slit 63 formed in rotating portion 56 and slit 85 formed in flange portion 71 in communication with each other, slit 63 and slit 85 form a pull-out passage 86 through which cable 45 can be pulled out.

Flange portion 71 is provided with holding portion 74 for holding charging plug 41 of cable unit 42.

Flange portion 71 is provided with a plurality of through holes 87 spaced apart from each other in the direction in which flange portion 71 extends. These through holes 87 are formed in flange portion 71 so as to be closer to outer circumferential edge 84 than to the outer circumferential surface of circumferential wall portion 60. Consequently, cable 43 wound around the outer circumferential surface of circumferential wall portion 60 is cooled by the air having passed through the through hole 87, so that a temperature rise at cable 43 can be suppressed.

Guide plate 73 is formed in a part of outer circumferential edge 84 of flange portion 71. Guide plate 73, which extends along outer circumferential edge 84, serves to suppress disarrangement of cable 43 when cable 43 is pulled out and when cable 43 is wound up.

A leg 88 is formed in the lower end of flange portion 71. Like leg 79, leg 88 is also formed so as to extend in the width direction of device body 52.

In this case, when leg 88 and leg 79 are installed on an imaginary flat plane, device body 52 can be free-standing. Accordingly, during use of charging device 40, device body 52 is removed from fixing plate 53, and can be free-standing on the ground surface.

Coupling member 72 couples back surface wall 70 and flange portion 71 to each other. Coupling member 72 is formed on the outer circumferential edge 84 side of coupling member 72. A plurality of coupling members 72 are arranged so as to be spaced apart from each other along outer circumferential edge 84.

In addition, this coupling member 72 is formed of a bolt and a nut, for example, and can disconnect flange portion 71 and back surface wall 70 from each other as appropriate.

Figure 6:
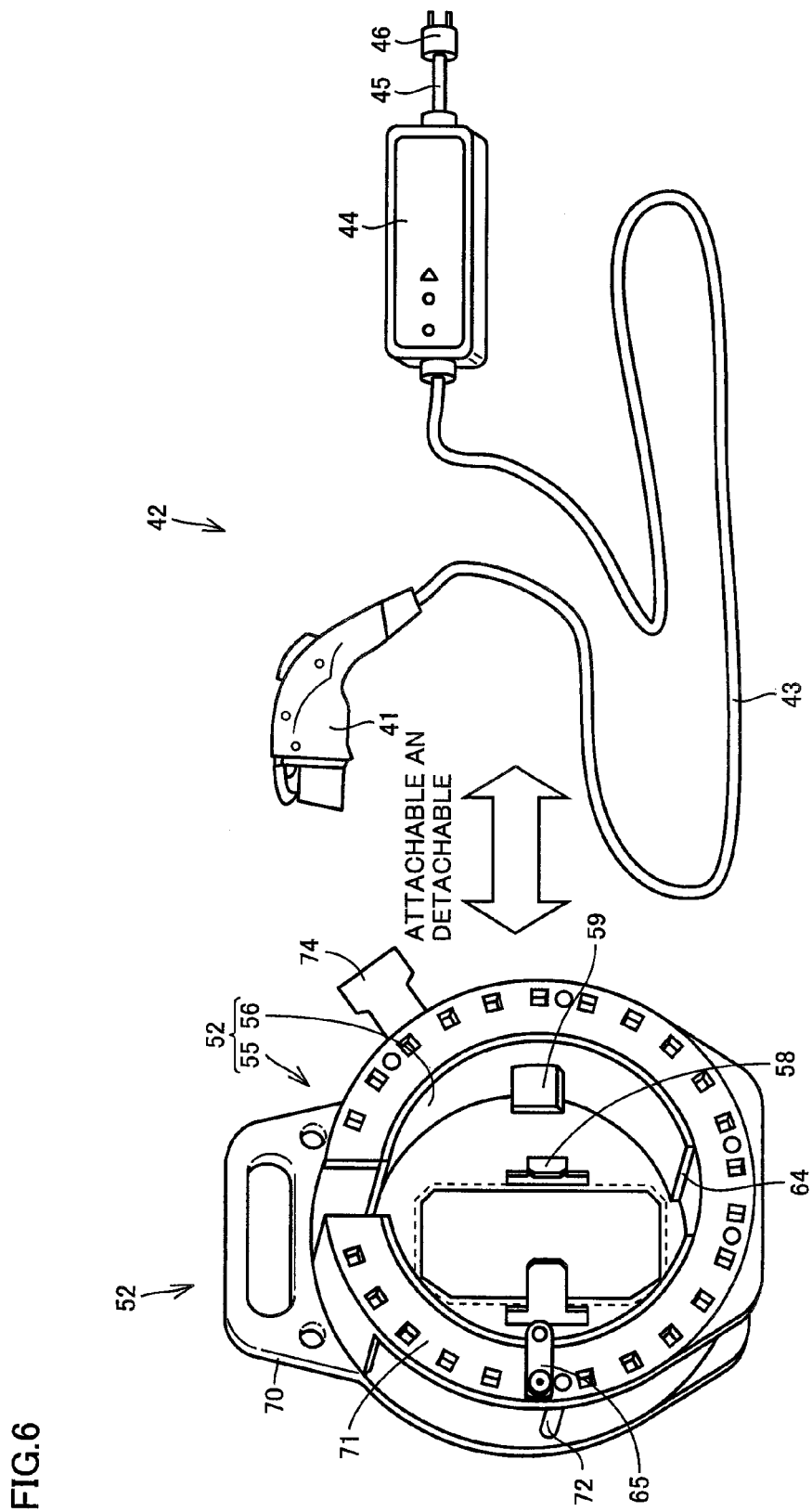
FIG. 6 is a perspective view showing the state where cable unit 42 is removed from device body 52.

FIG. 6 is a perspective view showing the state where cable unit 42 is removed from device body 52. As shown in FIG. 6, for removing cable unit 42, coupling member 72 is first removed from device body 52 in FIG. 5. Then, flange portion 71 is removed from device body 52. Then, charging plug 41 is removed from holding portion 74, and control unit 44 is removed from holding portion 58. Furthermore, plug 46 is removed from holding portion 59, and cable 43 wound around rotating portion 56 is pulled out.

In this way, cable unit 42 can be separated from device body 52. In addition, FIG. 6 shows the state where flange portion 71 is fixed again to back surface wall 70 after cable unit 42 is removed from device body 52.

Figure 7:
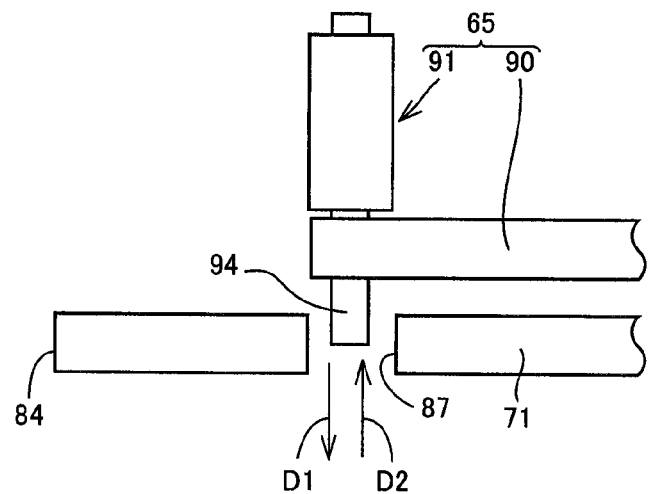
FIG. 7 is a side view showing a handle 65 and its surroundings.

FIG. 7 is a side view showing a handle 65 and its surroundings. As shown in this FIG. 6, handle 65 includes an arm 90 and a knob portion 91 provided at the end of arm 90. Arm 90 is connected to the opening edge of opening 62 of rotating portion 56 shown in FIG. 4.

Figure 8:
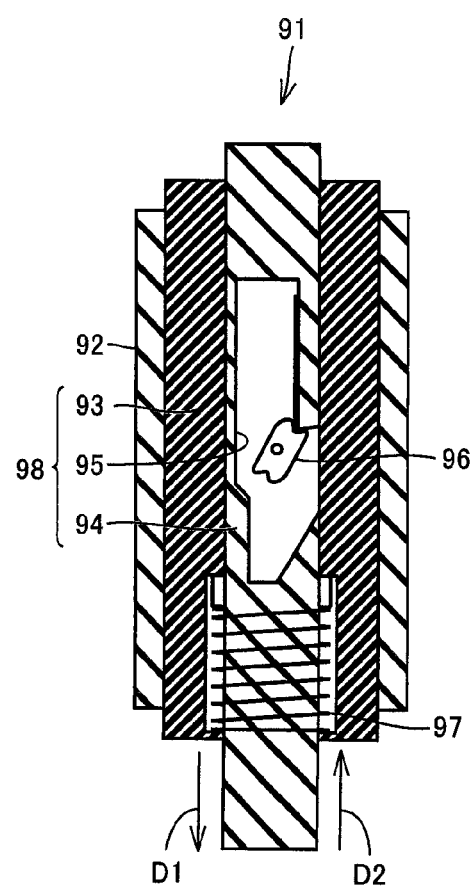
FIG. 8 is a cross-sectional view showing a knob portion 91.

FIG. 8 is a cross-sectional view showing knob portion 91. Knob portion 91 includes a hollow outer frame portion 92, and an alternate switch 98 provided within this outer frame portion 92. Alternate switch 98 functions as a holding mechanism for selectively limiting the rotation of rotating portion 56 with respect to fixing portion 55.

Alternate switch 98 includes a hollow shaft portion 93, a hollow shaft portion 94 disposed within this shaft portion 93 and having a hollow portion 95 formed therewithin, a rotating cam 96 disposed within hollow shaft portion 94, and a spring 97.

Outer frame portion 92 is provided so as to be rotatable with respect to shaft portion 93. Hollow shaft portion 94 is provided so as to be slidable within shaft portion 93 in both directions including a direction D1 and a direction D2. In addition, when hollow shaft portion 94 slides in direction D1, the end of hollow shaft portion 94 is inserted into through hole 87 shown in FIG. 7. On the other hand, the end of hollow shaft portion 94 inserted into through hole 87 slides in direction D2, hollow shaft portion 94 is pulled out from through hole 87.

Spring 97 biases hollow shaft portion 94 in direction D2. Thereby, hollow shaft portion 94 is biased by spring 97 so as to be inserted into shaft portion 93. Rotating cam 96 is provided rotatably with respect to shaft portion 93. Shaft portion 93 is formed in an oval shape and provided on its both ends with groove portions. These groove portions each are formed so as to receive the protrusion formed within hollow portion 95 of hollow shaft portion 94.

According to knob portion 91, when a user presses hollow shaft portion 94 in direction D1, rotating cam 96 and a protrusion formed within hollow portion 95 engage with each other, thereby fixing the position of hollow shaft portion 94 in the state where hollow shaft portion 94 protrudes from shaft portion 93 in direction D1.

In FIG. 7, when hollow shaft portion 94 is fixed while it protrudes, hollow shaft portion 94 is inserted into through hole 87 formed in flange portion 71.

Handle 65 is coupled to rotating portion 56 shown in FIG. 4. Accordingly, when hollow shaft portion 94 is inserted into through hole 87, rotating portion 56 is held in flange portion 71 and thereby prevented from rotating. In this way, hollow shaft portion 94 of alternate switch 98 functions as a stopper for holding rotating portion 56 in fixing portion 55.

As shown in FIG. 4, a plurality of through holes 87 are provided so as to be spaced apart from each other in the direction in which flange portion 71 extends. Accordingly, when the user appropriately selects through hole 87 into which hollow shaft portion 94 is inserted, the relative positional relationship between tube portion 57 and fixing portion 55 can be adjusted to fix tube portion 57 to fixing portion 55.

In addition, in order to disengage tube portion 57 and fixing portion 55 from each other, the upper end of hollow shaft portion 94 is pressed again in FIG. 8. When the upper end of hollow shaft portion 94 is pressed, rotating cam 96 rotates to thereby disengage the protrusion and rotating cam 96 formed within hollow shaft portion 94.

When rotating cam 96 and hollow shaft portion 94 are disengaged from each other, spring 97 presses hollow shaft portion 94, and the end of hollow shaft portion 94 is pulled out through the through hole 87. Thereby, tube portion 57 and fixing portion 55 fixed to each other are separated from each other.

Figure 9:
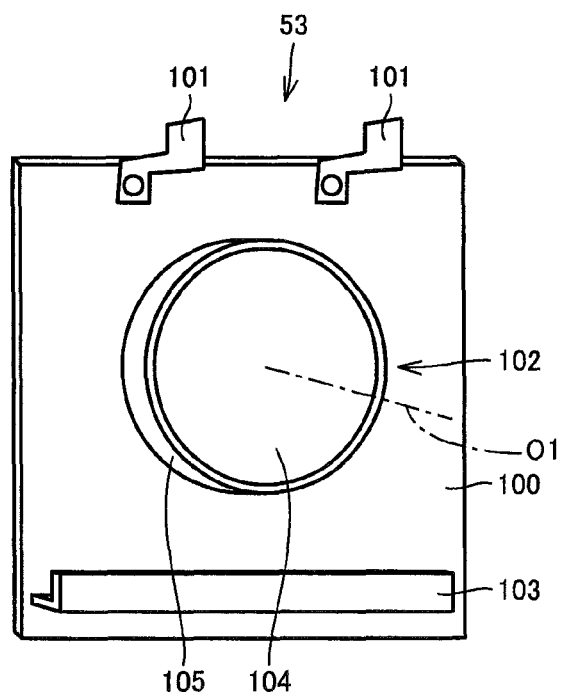
FIG. 9 is a perspective view showing a fixing plate 53.

FIG. 9 is a perspective view showing fixing plate 53. As shown in FIG. 9, fixing plate 53 includes a fixing plate 100 formed in a plate shape, a hook 101 formed on the upper end side of fixing plate 100, a protrusion 102 formed in the center portion of fixing plate 100, and a receiving portion 103 formed on the lower end side of fixing plate 100.

Protrusion 102 is formed in a cylindrical shape or circular truncated cone shape, for example. Protrusion 102 includes an upper surface 104 formed in a circular shape, and a circumferential surface 105 extending from the circumferential edge of upper surface 104 toward fixing plate 100. It is to be noted that a center line O1 shown in the figure passes through the center point on upper surface 104. In this case, the cross section of upper surface 104 in a plane perpendicular to center line O1 is shaped as a circle centered at center line O1. The circle centered at center line O1 also includes a circle centered at center line O1, and a shape substantially regarded as a circle centered at center line O1.

Figure 10:
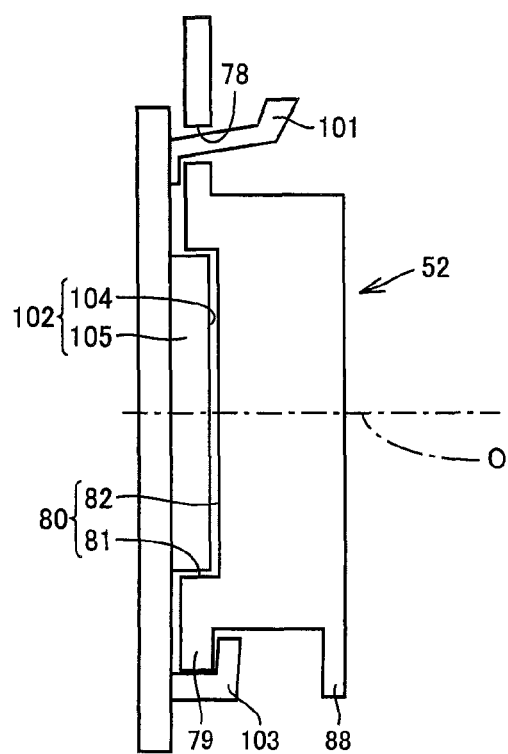
FIG. 10 is a diagram schematically showing the state where device body 52 is mounted on fixing plate 53.

FIG. 10 is a diagram schematically showing the state where device body 52 is mounted on fixing plate 53. As shown in FIG. 10, in the state where device body 52 is mounted on fixing plate 53, hook 101 of fixing plate 53 passes through a hole 78 formed in device body 52. Protrusion 102 of fixing plate 53 fits into a recess 80 formed in device body 52. Receiving portion 103 receives leg 79.

In the state where protrusion 102 fits into recess 80, rotation center line O and a center line O1 of protrusion 102 are aligned with each other. Circumferential surface 105 of protrusion 102 is in contact with inner circumferential surface 81 of recess 80 while upper surface 104 of protrusion 102 is in contact with bottom wall surface 82 of recess 80.

In the state where device body 52 is mounted on fixing plate 53, the user may hold handle 65 shown in FIG. 4 to rotate rotating portion 56. In this case, rotating portion 56 rotates about rotation center line O. On the other hand, circumferential surface 105 of protrusion 102 and inner circumferential surface 81 of recess 80 are in surface contact with each other, and further, upper surface 104 and bottom wall surface 82 are in surface contact with each other. Accordingly, the rotating force applied to handle 65 from the user is supported by the friction force between upper surface 104 and bottom wall surface 82, and the friction force between circumferential surface 105 and inner circumferential surface 81.

When device body 52 is attached to fixing plate 53, upper surface 104, circumferential surface 105, bottom wall surface 82, and inner circumferential surface 81 are arranged such that rotation center line O passes through the center of each of these surfaces. Furthermore, the rotating force is also applied to device body 52 so as to be centered at rotation center line O.

Accordingly, the friction force generated between upper surface 104 and bottom wall surface 82 is uniformly distributed between upper surface 104 and bottom wall surface 82. Similarly, the friction force generated between circumferential surface 105 and inner circumferential surface 81 is also uniformly distributed between circumferential surface 105 and inner circumferential surface 81.

In this way, by the rotating force applied to device body 52, concentration of the stress on a prescribed part can be suppressed, so that rattling of device body 52 can be suppressed.

Then, a method of using charging device 40 formed as described above will be hereinafter described with reference to FIGS. 11 to 13.

Figure 11:
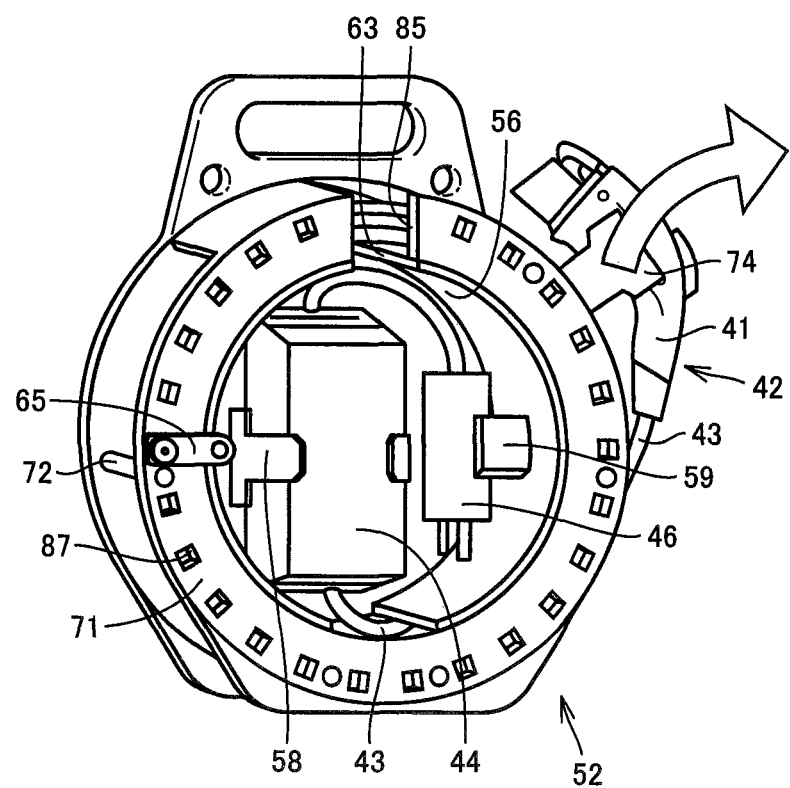
FIG. 11 is a perspective view showing the state where a cable 43 is wound around device body 52.
Figure 12:
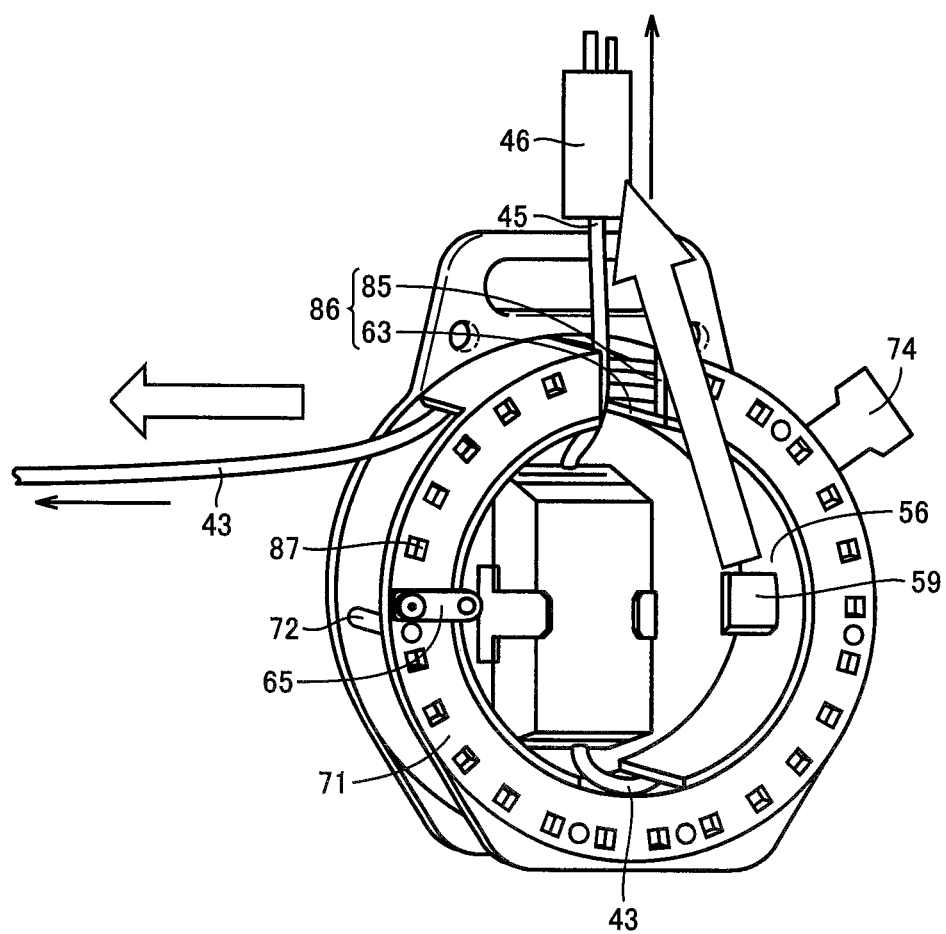
FIG. 12 is a diagram showing the state where charging device 40 is used.
Figure 13:
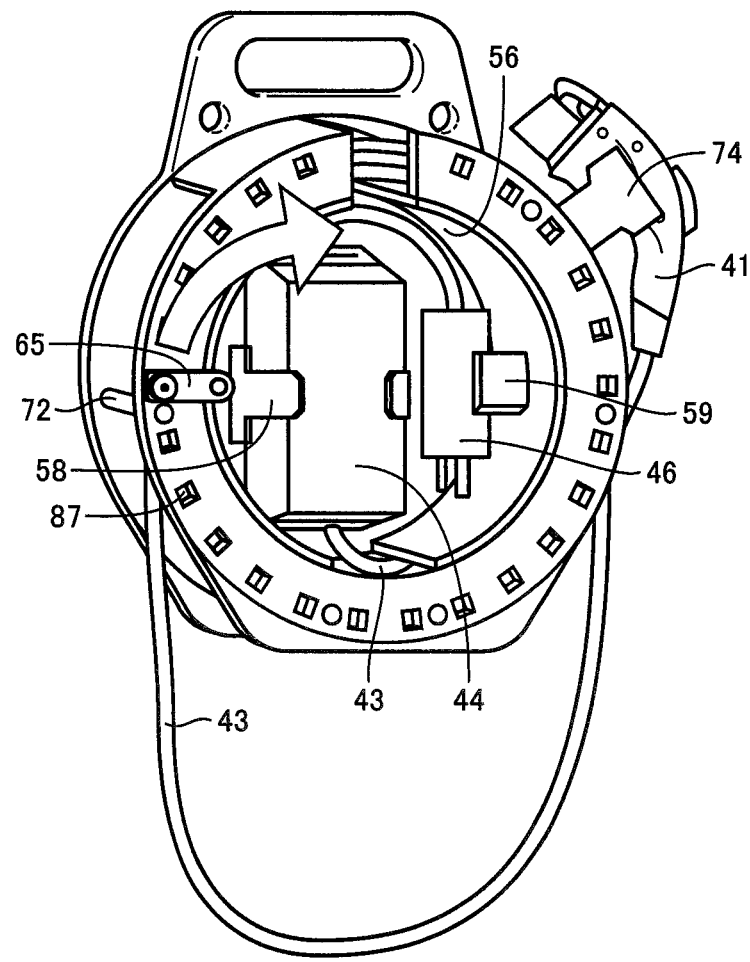
FIG. 13 is a diagram showing the state where charging device 40 is used.

Examples shown in FIGS. 11 to 13 each illustrate a method of use in the state where device body 52 is removed from fixing plate 53.

FIG. 11 is a perspective view showing the state where cable 43 is wound around device body 52. In the state shown in FIG. 11, plug 46 is held in holding portion 59 while control unit 44 is held in holding portion 58. Cable 43 is pulled out from within rotating portion 56 onto the outer circumferential surface of rotating portion 56, and further wound around the circumferential surface of rotating portion 56. Charging plug 41 is held in holding portion 74.

Then, in FIGS. 11 and 12, rotating portion 56 and flange portion 71 fixed by handle 65 are separated from each other.

Then, charging plug 41 is removed from holding portion 74. Then, cable 43 is pulled out from device body 52. When cable 43 is pulled out, rotating portion 56 rotates. In this case, control unit 44 is held in rotating portion 56, and therefore, also rotates in accordance with the rotation of rotating portion 56.

Then, rotating portion 56 is positioned with respect to fixing portion 55 such that slit 63 and slit 85 are brought into communication with each other. Then, rotating portion 56 is fixed to fixing portion 55 by handle 65.

A user's hand is inserted through the opening of rotating portion 56 to grip plug 46. Then, plug 46 is pulled out from rotating portion 56 and cable 45 is caused to pass through pull-out passage 86. Consequently, plug 46 extends above device body 52. Then, plug 46 is connected to a power supply, and charging plug 41 is connected to charging unit 21 of the vehicle.

Referring to FIG. 13, a description will be made about a method of housing cable unit 42 after completion of the charging operation that was performed in the state of use as shown in FIG. 12. As shown in FIG. 13, charging plug 41 is mounted on holding portion 74, and plug 46 is mounted on holding portion 59.

Then, when rotating portion 56 is rotated using handle 65 to wind up cable 43, cable unit 42 is housed in device body 52.

Then, a description will be made about a housing method for housing cable unit 42 in device body 52 again from the state where cable unit 42 is completely removed from device body 52, as shown in FIG. 6. First, coupling member 72 is removed and flange portion 71 is removed from back surface wall 70. Then, control unit 44 is mounted on holding portion 58 and plug 46 is mounted on holding portion 59. Then, cable 43 is caused to pass through slit 64. Then, flange portion 71 is fixed to back surface wall 70 by coupling member 72. Then, handle 65 is rotated to wind up cable 43 around the outer circumferential surface of rotating portion 56. Then, charging plug 41 is mounted on holding portion 74. In this way, cable unit 42 is housed in device body 52.

It should be understood that the embodiments disclosed herein are illustrative and non-restrictive in every respect. The scope of the present invention is defined by the terms of the claims, rather than the description of the above embodiments, and is intended to include any modifications within the scope and meaning equivalent to the terms of the claims.

INDUSTRIAL APPLICABILITY

The present invention is suitable for a cable winding device.

REFERENCE SIGNS LIST 1 engine, 2 power split device, 3 front wheel, 4 converter, 5, 6 inverter, 8 switching element, 9 converter, 10 ECU, ECU7 vehicle, 11 body, 12, 104 upper surface, 13 lower surface, 14, 105 circumferential surface, 15, 16 side surface, 17 front surface, 18 back surface, 20 oil feeding portion, 20a nozzle insertion portion, 20b, 21b cover portion, 21 charging unit, 21a charging connector, 22 passenger entry/exit opening, 23, 24 door, 40 charging device, 41 charging plug, 42 cable unit, 43, 45 cable, 44 control unit, 46 plug, 50 cable winding device, 51 power supply, 52 device body, 53, 100 fixing plate, 55 fixing portion, 56 rotating portion, 57 tube portion, 58, 59, 74 holding portion, 60 circumferential wall portion, 61 wall surface, 62 opening, 63, 64, 85 slit, 65 handle, 70 back surface wall, 71 flange portion, 72 coupling member, 73 guide plate, 75 support plate, 76 gripping portion, 77 insertion hole, 78 hole, 79, 88 leg, 80 recess, 81 inner circumferential surface, 82 bottom wall surface, 83 inner circumference edge, 84 outer circumferential edge, 86 pull-out passage, 87 through hole, 90 arm, 91 knob portion, 92 outer frame portion, 93 shaft portion, 94 hollow shaft portion, 95 hollow portion, 96 rotating cam, 97 spring, 98 alternate switch, 101 hook, 102 protrusion, 103 receiving portion, 2010 Japanese Patent Laying-Open Application, B battery, C capacitor, CNTL1 control signal, FT fuel tank, L reactor, MG1, MG2, MG1, MG2 motor generator, O rotation center line, O1 center line.

The invention claimed is:

1. A cable winding device around which a cable unit is wound, said cable unit including: (i) a first connector, (ii) a second connector connected to a power supply, (iii) a first cable connected to said first connector, (iv) a control unit connected to said first cable and controlling an amount of a current flowing through said first cable, and (v) a second cable connecting said second connector and said control unit, said cable winding device comprising:
    a fixing portion; and
    a rotating portion provided rotatably with respect to said fixing portion, said rotating portion including:
        a tube portion having an outer circumferential surface around which said first cable is wound, said tube portion including a first end and a second end arranged in a direction extending in a rotation center line of said rotating portion, said first end being provided with an opening through which said second connector can be removed,
        a first holding portion provided within said tube portion and holding said control unit, and
        a second holding portion provided within said tube portion and holding said second connector.

2. The cable winding device according to claim 1, wherein
    said fixing portion includes a flange portion provided along an outer circumferential edge of said first end of said tube portion and supporting said first cable wound around said tube portion,
    said flange portion has an inner circumference edge and an outer circumferential edge, said flange portion is provided with a first slit extending from said inner circumference edge to said outer circumferential edge,
    said tube portion is provided with a second slit extending from an opening edge of said opening toward said second end, and
    said first slit and said second slit are in communication with each other such that a passage is formed, through which said second cable is pulled out from said rotating portion.

3. The cable winding device according to claim 1, wherein
    said fixing portion includes a flange portion provided along an outer circumferential edge of said first end of said tube portion and supporting said first cable wound around said tube portion, and
    a through hole is provided in a portion of said flange portion located closer to an outer circumferential edge of said flange portion than to the outer circumferential edge of said first end.

4. The cable winding device according to claim 1, further comprising a holding mechanism limiting rotation of said rotating portion with respect to said fixing portion.

5. The cable winding device according to claim 4, wherein
    said fixing portion includes a flange portion provided along an outer circumferential edge of said first end of said tube portion and supporting said first cable wound around said tube portion,
    said flange portion is provided with a through hole, and
    said holding mechanism includes a stopper fitting into said through hole.

6. The cable winding device according to claim 1, further comprising an attachment member fixed to an object to be fixed, and said fixing portion can be removably attached to said attachment member.

7. The cable winding device according to claim 6, wherein
    said rotating portion is provided rotatably about a rotation center line,
    said attachment member includes a protrusion formed at a position in which said rotation center line extends, when said fixing portion is mounted on said attachment member,
    said protrusion protrudes in a direction in which said rotation center line extends,
    said fixing portion is provided with a first recess into which said protrusion fits,
    a cross section of said protrusion in a plane perpendicular to said rotation center line is shaped as a circle centered at said rotation center line, and
    said first recess has an inner circumferential surface extending along an outer circumferential surface of said protrusion.

8. The cable winding device according to claim 1, wherein said fixing portion is provided with a gripping portion gripped by a user.

9. The cable winding device according to claim 1, wherein
    said fixing portion includes a leg, and
    said fixing portion is free-standing by installing said leg on an imaginary flat plane.

* * * * *